May 24, 1955
E. E. KELLEMS
2,708,792
DRAFTING INSTRUMENT
Filed April 6, 1953
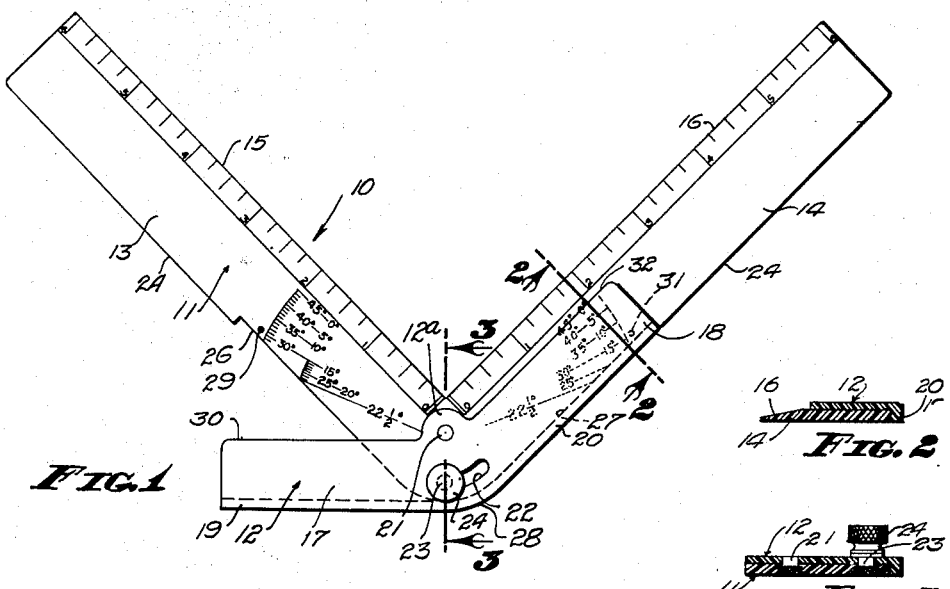
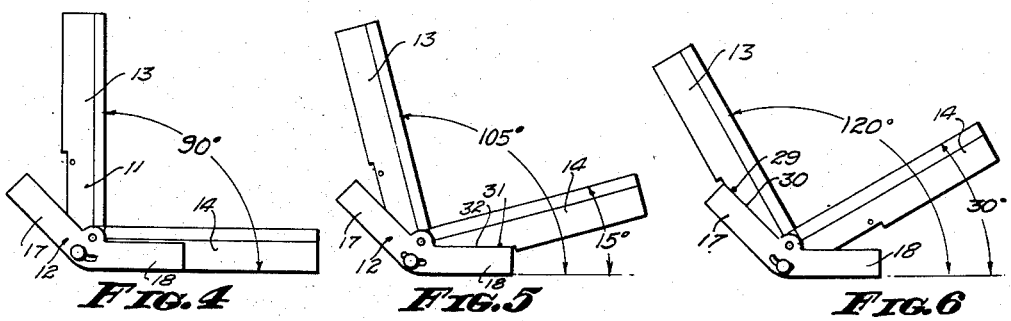
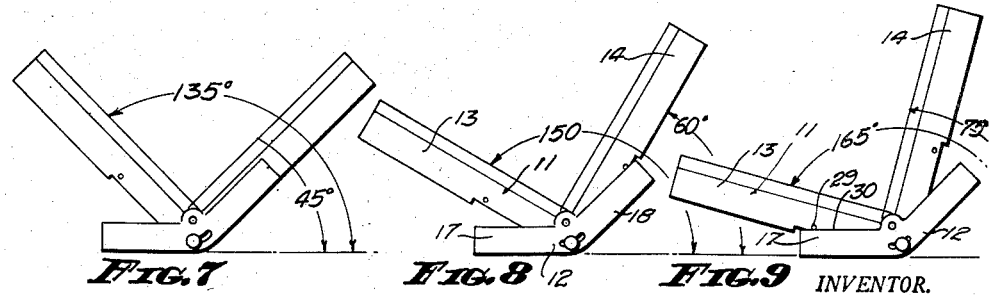
INVENTOR.
EDGAR E. KELLEMS
BY
ATTORNEYS

United States Patent Office 2,708,792
Patented May 24, 1955

2,708,792

DRAFTING INSTRUMENT

Edgar E. Kellems, Banning, Calif.

Application April 6, 1953, Serial No. 346,925

12 Claims. (Cl. 33—93)

This invention relates to drafting instruments and, more particularly, to instruments for drawing lines at various angles to a reference line.

An outstanding object of this invention is the provision of a drafting instrument that will indicate a plurality of useful angles with respect to a reference line.

Another object of the present invention is to provide a single instrument that will perform the functions ordinarily served by a plurality of triangles.

It is still another object of this invention to provide an instrument for indicating all angles from zero to 180 degrees at 15 degree intervals.

A further object is to provide a drafting instrument which incorporates complementary protractor scales so that angular indications of any degree or fraction thereof from zero to 180 degrees may be made.

Another object of the present invention is to provide a drafting instrument which is simple in construction and operation and which involves no intricate parts that may tend to wear or become inoperative.

A still further object of this invention is to provide a drafting instrument that may be inexpensively fabricated from easily obtainable materials on automatic machinery and requires no special castings or machined parts.

With these and other objects in view, as will be apparent to those skilled in the art, the invention resides in the combination of parts set forth in the specification and covered by the claims appended hereto.

The character of the invention, however, may best be understood by reference to certain of its structural forms, as illustrated by the accompanying drawings in which:

Figure 1 is a plan view of my drafting instrument.

Figure 2 is a sectional view thereof through 2—2 of Figure 1.

Figure 3 is a sectional view thereof through 3—3 of Figure 1.

Figure 4 is a schematic view of the invention in use to indicate angles of zero and 90 degrees.

Figure 5 is a schematic view of the invention in use to indicate angles of 15 and 105 degrees.

Figure 6 is a schematic view of the invention in use to indicate angles of 30 and 120 degrees.

Figure 7 is a schematic view of the invention in use to indicate angles of 45 and 135 degrees.

Figure 8 is a schematic view of the invention in use to indicate angles of 60 and 150 degrees.

Figure 9 is a schematic view of the invention in use to indicate angles of 75 and 165 degrees.

Like reference characters denote like parts in the several figures of the drawings.

In the art of drafting, the angles at 15 degree intervals from zero to 180 degrees are used quite often. In the past it has been the practice to obtain these angles by the use of various combinations of the angles on a 30–60–90-degree triangle in conjunction with the usual T-square which is used as a base reference line. This system of obtaining these commonly-used angles has many disadvantages. In obtaining "combination" angles, such as 75 degrees, the pressure of the pen or pencil on the edge indicating the angle tends to slide the triangles along one another and along the T-square. To prevent such sliding, the draftsman may lay one hand over the combination of triangles, but he cannot give proper attention to the line he is making while so occupied. The difficulties encountered in drawing a series of parallel lines, as in cross-section work, with such a combination of triangles are well-known. The drafting instrument of the present invention obviates these difficulties of the prior art methods and devices.

Referring first to Figure 1, which best shows the general characteristics of the invention, the drafting instrument is indicated generally by the reference character 10. The drafting instrument 10 comprises two main parts, an angle member 11 and a base member 12. The angle member 11 is preferably made from transparent plastic, is L-shaped, and has legs 13 and 14 of equal length and width and which are integrally formed at a right angle. The legs 13 and 14 are provided with beveled inner edges 15 and 16, respectively. The base member 12 is also made of transparent plastic (although it may be made of metal) and is generally V-shaped at an angle of 135 degrees. The V-shaped base member 12 is formed by two legs 17 and 18 of equal length and width and integrally joined at the appropriate angle. The outer edges of these legs 17 and 18 are provided with flanges 19 and 20, respectively. The base member 12 is provided with a projection 12a at the intersection of its upper or internal margin. The projection is perforated to form a bearing which receives a pin 21 secured in the underlying angle member 11 adjacent the intersection of its inner edges. The beveled edges 15 and 16 so terminate as to leave sufficient material to permit firm mounting of the pivot pin 21 in the angle member 11.

The base member 12 is provided with a slot 22 at its apex, which slot is concentric with the pivot pin 21. The angle member 11 has a stud 23 imbedded therein and this stud extends through the slot 22. A finger nut 24 is threaded on the stud 23 whereby the base member 12 can be clamped between the angle member 11 and the nut 24 to lock it in a desired position of relative rotation relative thereto.

The outer edges 24 and 25 of the legs 13 and 14 of the angle member are recessed at 26 and 27, respectively. These recesses are of a size and shape to receive the flanges 19 and 20 of the base member, whereby the outer edges of the flanges and the outer edges of the angle member form unbroken edge lines. Furthermore, the junction or apex of the outer edges 24 and 25 of the angle member is rounded at 28 to prevent interference with the flanges of the base member.

The leg 13 of the angle member is provided with an aperture 29 of such a size as to receive the end of a pointed object such as a compass or a well-sharpened pencil. This aperture is so situated that when a pointed object is inserted therein and the base member and angle member are pivoted relative to each other until the pointed object rests against the inner edge 30 of the base member, the angle between the edge 15 of the angle member and the flange 19 of the base member is equal to 15 degrees.

The leg 14 of the angle member is provided with an aperture 31 similar to aperture 29. This aperture is so situated that when a pointed object is inserted therein and the base and angle members pivoted relative to each other until the pointed object rests against the inner edge 32 of the base member, the angle between the edge 15 of the angle member and the flange 19 of the base member is equal to 30 degrees.

In use, the drafting instrument is laid on the paper on the side of the T-square away from the draftsman, as is usual with triangles and the like. The edge of the T-square is used as a reference line to which all angularities are referred. The instrument is laid on the paper and is used with the angle member toward the paper and the base member and the finger nut in the uppermost position. Since the free edges of the flanges of the base member are flush with the lower surface of the angle member, these edges will also contact the paper. It can be seen now that Figure 1 represents the instrument as seen from above the paper during use, while Figure 2 represents the instrument as seen from beneath, or when turned over. Of course, the edges 15 and 16 are beveled on the upper surface of the angle member; also, these edges form exactly a right angle.

Figures 3 through 8 show schematically how the various angles are arrived at by use of the present invention. The description of the operation will be described for the various specific angles. In every case, the instrument is shown in its proper position with the intended upper side uppermost, as in Figure 1.

*0 and 90 degrees.*—Figure 4 shows the use of the instrument in obtaining these angles. The finger nut 24 is loosened and the angle and base members rotated relative to each other until the flange 19 of the leg 17 of the base member resides in the recess 26 of the leg 13 of the angle member. Then, the nut 24 is tightened. When the leg 17 and the flange 19 of the base member are pressed against the edge of the T-square, shown as a base line in the drawings, the edge 15 of the leg 13 of the angle member will be at an angle of 0 degrees to the T-square and the edge 16 of the leg 14 will be at an angle of 90 degrees thereto. The 0 degree operation will only be needed, of course, when the edge of the T-square is badly notched, or if a beveled edge is needed. The 90 degree operation replaces the use of a triangle having a 90 degree apex.

*15 and 105 degrees.*—Figure 5 shows the use of the instrument to obtain these angles. After the nut 24 is loosened, the aperture 29 is placed adjacent to the inner edge 30 of the leg 17 of the base member by use of a pointed object inserted therein. Then, the nut is tightened and the parts locked together. When the flange 19 of the leg 17 of the base member is pressed against the edge of a T-square, the edge 15 of the angle member forms an angle of 15 degrees with the T-square and the edge 16 forms an angle of 105 degrees therewith.

*30 and 120 degrees.*—Figure 6 shows the operation of the instrument in obtaining these angles. After the nut 24 is loosened, the angle and base members are rotated relative to each other until the aperture 31 is adjacent to the inner edge 32 of the leg 18 of the base member. This is done by inserting a pointed device, such as a well-sharpened pencil, into the aperture and turning the angle member until the edge 32 strikes the device. The nut is then tightened. When the flange 19 is held against the edge of the T-square, the edge 15 forms an angle of 30 degrees with the edge of the T-square and the edge 16 forms an angle of 120 degrees therewith.

*45 and 135 degrees.*—Figure 7 shows the operation of the instrument to obtain these angles. The instrument is place in the condition described for the angles of 0 and 90 degrees, shown in Figure 4; that is to say, the parts are clamped together with the flange 19 residing in the recess 26. However, this time the flange 20 of the leg 18 of the base member is pressed against the edge of the T-square. In that condition, the edge 15 forms an angle of 45 degrees with the edge of the T-square and the edge 16 forms an angle of 135 degrees therewith.

*60 and 150 degrees.*—Figure 8 shows the use of the instrument to obtain these angles. The instrument is first placed in the condition described for obtaining the angles of 15 and 105 degrees, shown in Figure 5; that is to say, the aperture 29 is adjacent to the edge 30 of the base member and the two parts are clamped together by use of the nut 24. However, it is now the flange 20 that is pressed against the edge of the T-square and, then, the edge 15 forms an angle of 60 degrees with respect to the edge of the T-square and the edge 16 forms an angle of 150 degrees therewith.

*75 and 165 degrees.*—Figure 9 shows the operation of the instrument to obtain these angles. The instrument is placed in the condition used to obtain the angles of 30 and 120 degrees, shown in Figure 6; that is to say, the aperture 31 is placed adjacent to the edge 32 and the nut 24 tightened. Then, the flange 20 is pressed against the edge of the T-square. Then the edge 15 resides at an angle of 75 degrees to the edge of the T-square and the edge 16 resides at an angle of 165 degrees thereto.

Another possible arrangement of the instrument is possible but is not shown in the drawings. That arrangement is when the flange 20 of the leg 18 of the base member resides in the recess 27 of the leg 14 of the angle member. By use of this arrangement, 0 and 90 degrees can be obtained and a right angle obtained in another quadrant, as is sometimes desirable.

Thus, it can be seen that, by use of the drafting instrument of the invention, the following angles can be obtained: 0, 15, 30, 45, 60, 75, 90, 105, 120, 135, 150 and 165 degrees, as well as the angle obtained by adding 180 degrees to any of these angles.

In addition or in lieu of the apertures 29 and 31 the two legs 13 and 14 may be provided with protractor scales 33 and 34 which cooperate with edges 30 and 32. As shown in Figure 1 each protractor scale has a range of 22½ degrees. These scales are complementary; that is, after reaching the limit of one protractor scale further angles may be obtained by use of the other scale. To facilitate such complementary use each scale bears ascending and descending indicia.

It will be observed that by use of the protractor scale in combination with the six positions noted in Figures 4 to 9 inclusive, that any angle from zero to 180 degrees may be obtained and that interpolation to a fraction of a degree is practical.

It is obvious that minor changes may be made in the form and construction of the invention without departing from the material spirit thereof. It is not, however, desired to confine the invention to the exact form herein shown and described, but it is desired to include all such as properly come within the scope claimed.

Having thus described my invention, what I claim as new and desire to secured by Letters Patent is:

1. A drafting instrument, comprising: and obtuse V-shaped base member having an external angle and an internal angle and adapted to rest along a reference line; and an L-shaped angle member rotatably attached to said base member within the internal angle thereof for indicating angles relative to said reference line.

2. A drafting instrument, comprising: an obtuse V-shaped base member having at least one straight edge adapted to rest along a reference line; an L-shaped angle member rotatably attached to said base member for movement within the included angle of said base member and having at least one straight edge; and means for locking the base and angle members in various positions of relative rotation so that the straight edge of said base member and the straight edge of said angle member determine fixed angles relative to each other.

3. A drafting instrument, comprising: a V-shaped base member having two straight edges at an angle of 135 degrees to each other, either of said straight edges being adapted to rest along a reference line; an L-shaped angle member rotatably attached to said base member for movement within the included angle thereof and having two straight edges at a right angle to each other; and means for locking the base and angle members in various positions of relative rotation so that the straight edges of the base member and the straight edges of the angle member determine angles which are multiples of 15 degrees relative to one another.

4. A drafting instrument, comprising: a base member having two straight edges arranged at an angle of 135 degrees to each other to form an internal angle and an external angle; an angle member having two straight edges at a right angle to each other; a pivot pin joining the angle member and the base member within the internal angle of said base member; a slot in one of said members concentric with said pivot pin; a stud fastened to the other of said members and extending through said slot; and a finger nut on said stud serving to lock the base and angle members in various positions of relative rotation so that the straight edges of the base member and the straight edges of the angle member determine angles which are multiples of 15 degrees to one another.

5. A drafting instrument, comprising: a V-shaped base member, the two legs of which have outer straight edges, the straight edges meeting at an angle of 135 degrees; an L-shaped angle member, the two legs of which have inner straight edges meeting at an angle of 90 degrees; a pivot pin joining the angle member and the base member adjacent to the junction of the inner edges of the legs of said base member; a slot in one of said members, which slot is concentric with said pivot pin; a stud fastened to the other of said members and extending through said slot; and a finger nut on said stud serving to lock the base and angle members in various positions of relative rotation so that the outer straight edges of the base member and the inner straight edges of the angle member extend at angles to one another which are multiples of 15 degrees.

6. A drafting instrument, comprising: a V-shaped base member, the two legs of which have outer straight edges which meet at an angle of 135 degrees to form an external angle and an internal angle; an L-shaped angle member, the two legs of which have inner straight edges meeting at an angle of 90 degrees; a pivot pin rotatably joining the angle member and the base member at a point adjacent to the intersections of their legs to dispose said L-shaped member within the internal angle of said base member; and means locking said members in various positions of relative rotation about said pivot pin so that the outer straight edges of the base member and the inner straight edges of the angle member extend at selected angles to one another.

7. A drafting instrument, comprising: an L-shaped angle member having a pair of right angularly related legs, their inner margins forming straight edges; a V-shaped base member overlying said angle member and having a pair of obtusely related legs, the outer margins of said legs having depending base flanges overhanging the legs of said angle member; a pivot pin joining said angle member and base member adjacent their apices to permit movement of said angle member within the angle defined by said base flanges; and means for locking said base member and angle member together, whereby said base elements and the straight edges may define selected angles.

8. A drafting instrument, comprising: an L-shaped angle member having a pair of right angularly related legs, their inner margins forming straight edges; a V-shaped base member overlying said angle member and having a pair of obtusely related legs, the outer margins of said legs having depending base flanges overhanging the legs of said angle member; a pivot pin joining said angle member and base member adjacent their apices to permit movement of said angle member within the angle defined by said base flanges; means for locking said base member and angle member together, whereby said base elements and the straight edges may define selected angles; and means in the form of recesses in said angle member adapted to receive a pointed instrument for location of said recesses in coincidence with the inner edges of said base member thereby to dispose said angle member and base member in preselected angular relations.

9. A drafting instrument as set forth in claim 7 wherein the legs of said angle member project beyond said base member and their outer margins are recessed in the region of said base flanges, whereby the projecting portions of said outer margins may coincide therewith.

10. A drafting instrument as set forth in claim 8 wherein the legs of said angle member project beyond said base member and their outer margins are recessed in the region of said base flanges, whereby the projecting portions of said outer margins may coincide therewith.

11. A drafting instrument, comprising: an obtuse V-shaped base member having at least one straight edge adapted to rest along a reference line; an L-shaped angle member rotatably attached to said base member for movement within the included angle of said base member and having at least one straight edge; means for locking the base and angle members in various positions of relative rotation so that the straight edge of said base member and the straight edge of said angle member determine fixed angles relative to each other; and complementary protractor scales on said base member cooperating with the said angle member to indicate the angular relation of said members.

12. A drafting instrument, comprising: an L-shaped angle member having a pair of right angularly related legs, their inner margins forming straight edges; a V-shaped base member overlying said angle member and having a pair of obtusely related legs, the outer margins of said legs having depending base flanges overhanging the legs of said angle member; a pivot pin joining said angle member and base member adjacent their apices to permit movement of said angle member within the angle defined by said base flanges; means for locking said base member and angle member together, whereby said base elements and the straight edges may define selected angles; means in the form of recesses in said angle member adapted to receive a pointed instrument for location of said recesses in coincidence with the inner edges of said base member thereby to dispose said angle member and base member in preselected angular relations; and complementary protractor scales on one of said members for cooperation with a reference line of the other of said members, to indicate the angular relationship of said members.

References Cited in the file of this patent

UNITED STATES PATENTS

| 926,615 | Spoffard | June 29, 1909 |

FOREIGN PATENTS

| 21,413 | Great Britain | Oct. 21, 1905 |
| 390,054 | France | July 18, 1908 |